J. GOHY.
MACHINE FOR THE PRODUCTION OF PAPER TUBES.
APPLICATION FILED APR. 7, 1908.

968,241.

Patented Aug. 23, 1910.
6 SHEETS—SHEET 1.

Witnesses:
V. E. Markmann
M. C. Powell

Inventor:
Jean Gohy
By Griffin Bencham
Attys.

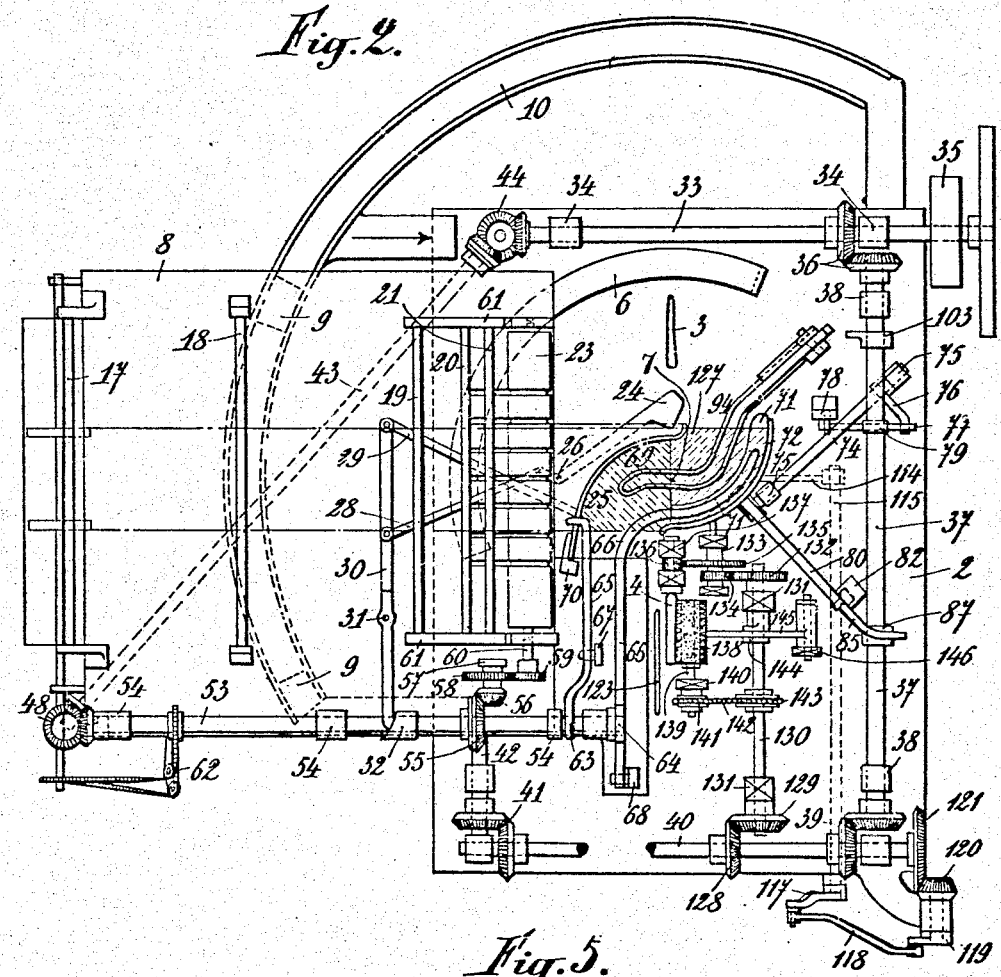
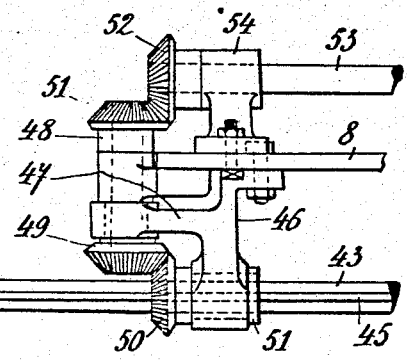

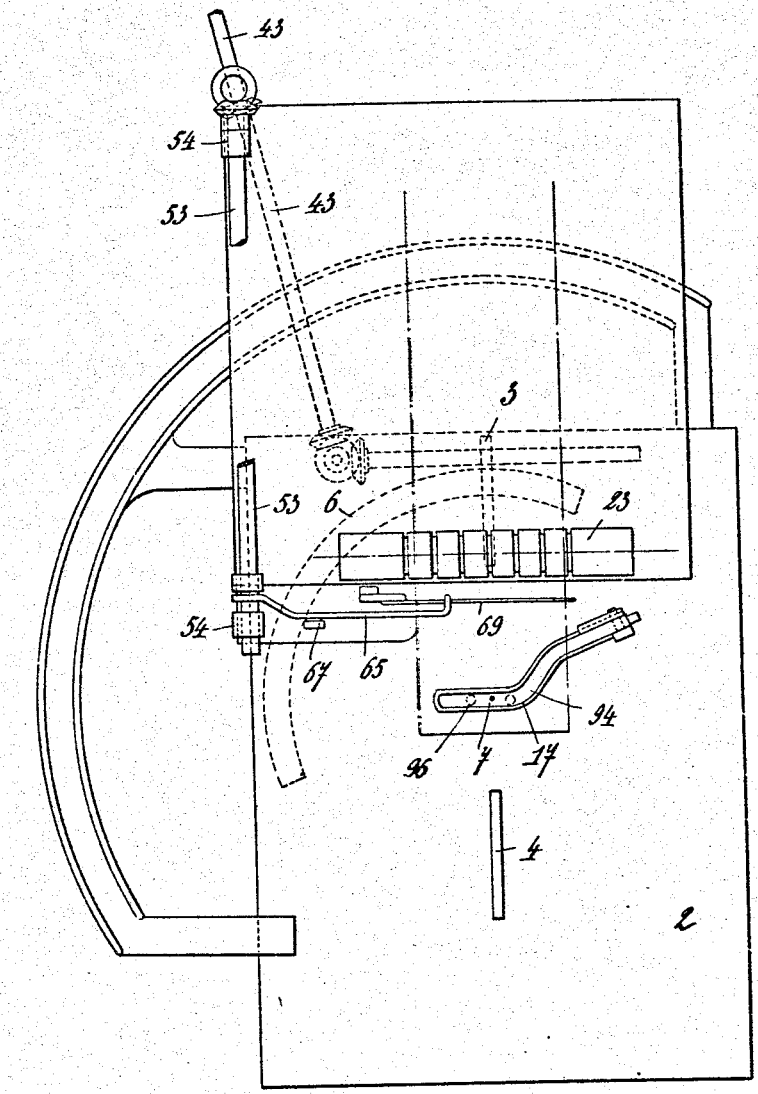

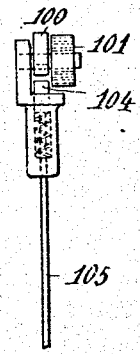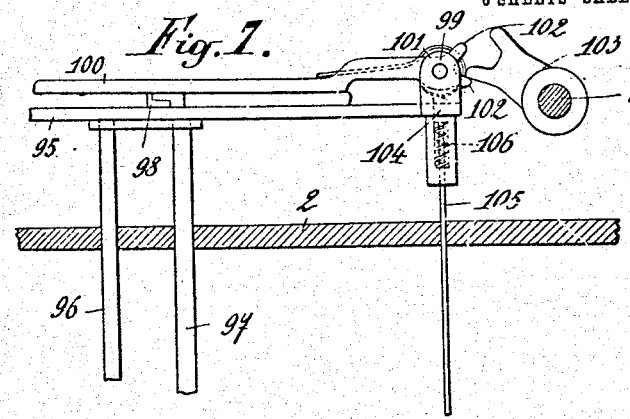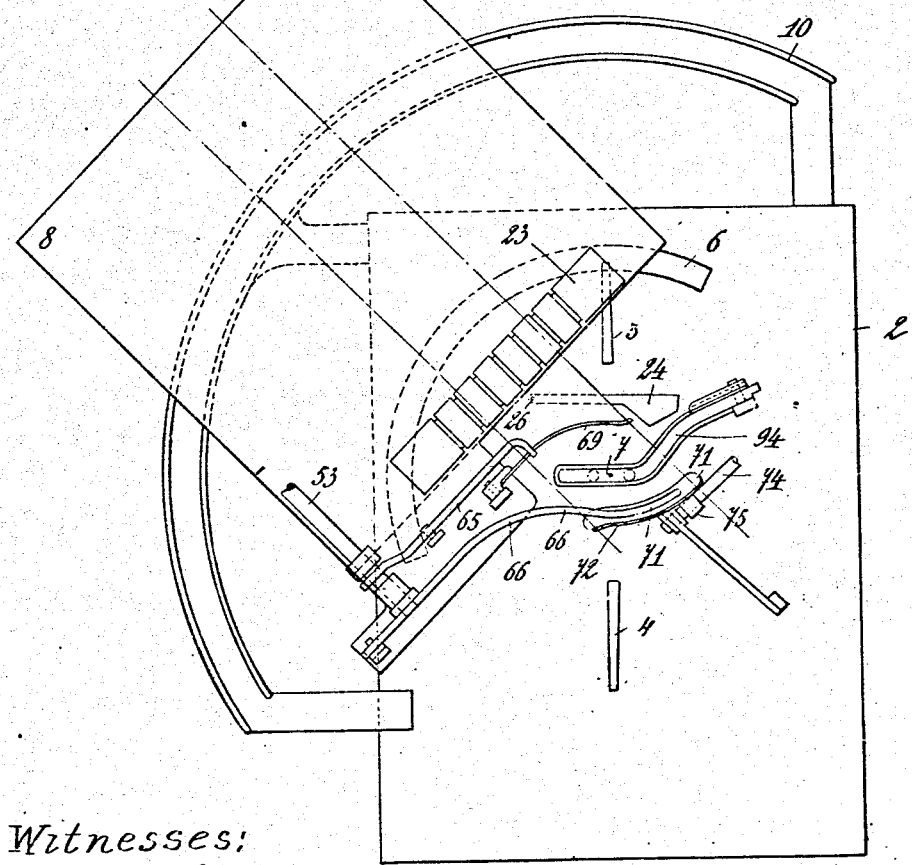

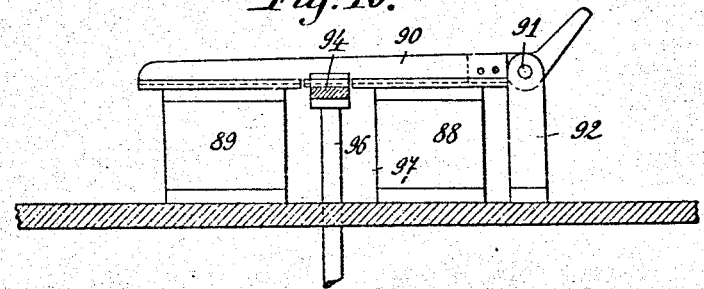
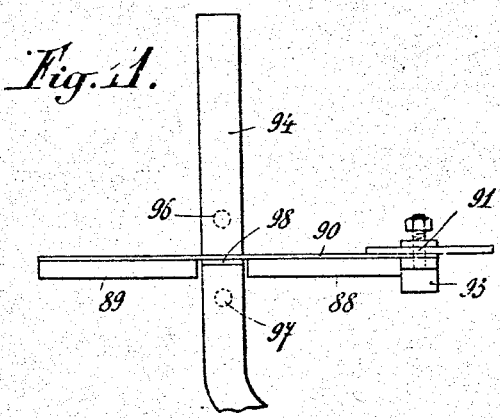
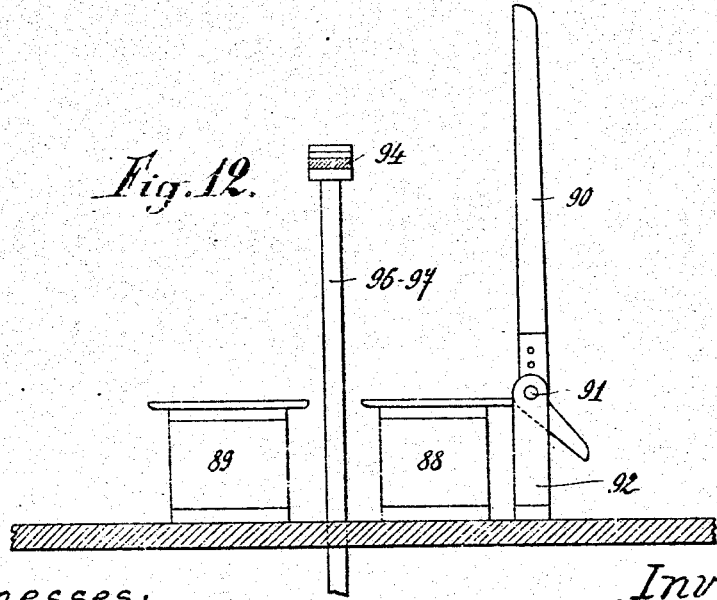

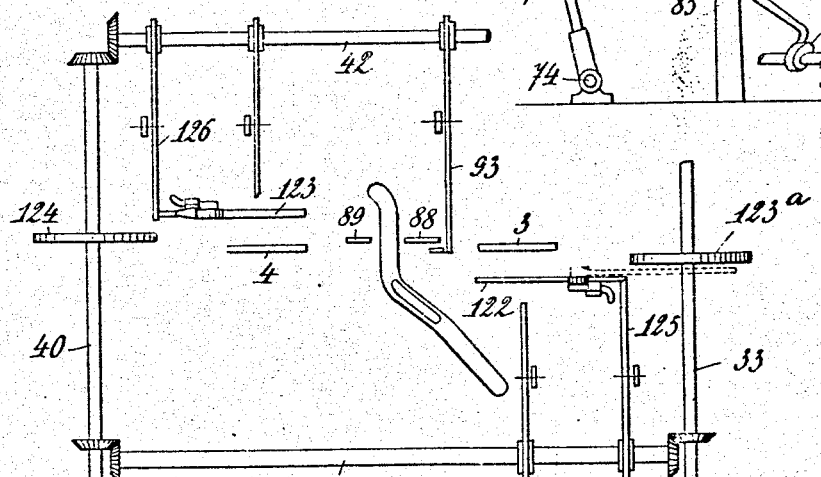

UNITED STATES PATENT OFFICE.

JEAN GOHY, OF ENSIVAL, NEAR VERVIERS, BELGIUM.

MACHINE FOR THE PRODUCTION OF PAPER TUBES.

968,241.      Specification of Letters Patent.      Patented Aug. 23, 1910.

Application filed April 7, 1908. Serial No. 425,696.

*To all whom it may concern:*

Be it known that I, JEAN GOHY, a subject of Belgium, residing at Ensival, near Verviers, in the Kingdom of Belgium, have invented new and useful Improvements in Machines for the Production of Paper Tubes, of which the following is a specification.

This invention relates to a machine for the production of paper-tubes of the kind described in my former application for patent Serial No. 272,910 filed August 5, 1905, said application having eventuated in Patent No. 883,949, granted April 7, 1908. In the said patent I have shown how it is possible to produce tubes of various shapes with a single machine comprising a feed mechanism, a cutting mechanism and a tube-forming mechanism provided that the said mechanisms be combined with means whereby the positions of the tube-forming mechanism and the feed mechanism may be varied relatively to each other. In the construction which is described in detail in the said former patent the change in the relation of the tube-forming mechanism and feed mechanism is effected by varying the relative positions of the tube-forming mechanism to the feed mechanism. Under certain circumstances, however, it may be more advantageous to reverse the construction and to vary only the positions of the feed-mechanism to the tube-forming mechanism and with this object in view my invention consists in certain novel and improved arrangements and combinations of parts as will be hereinafter fully described and pointed out in the appended claims.

Figure 1:
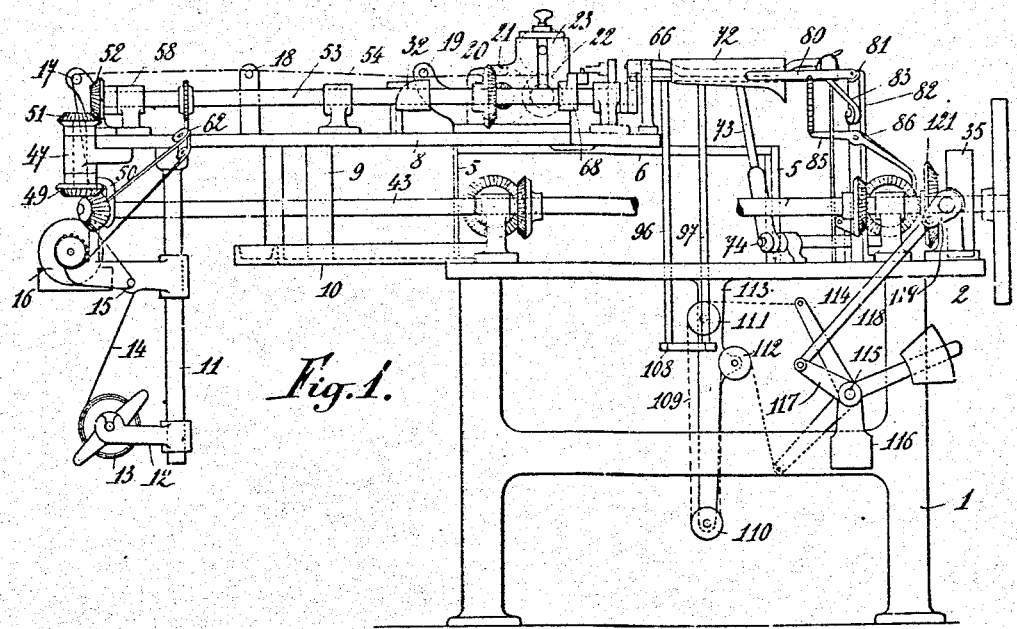
Figures 4, 6:
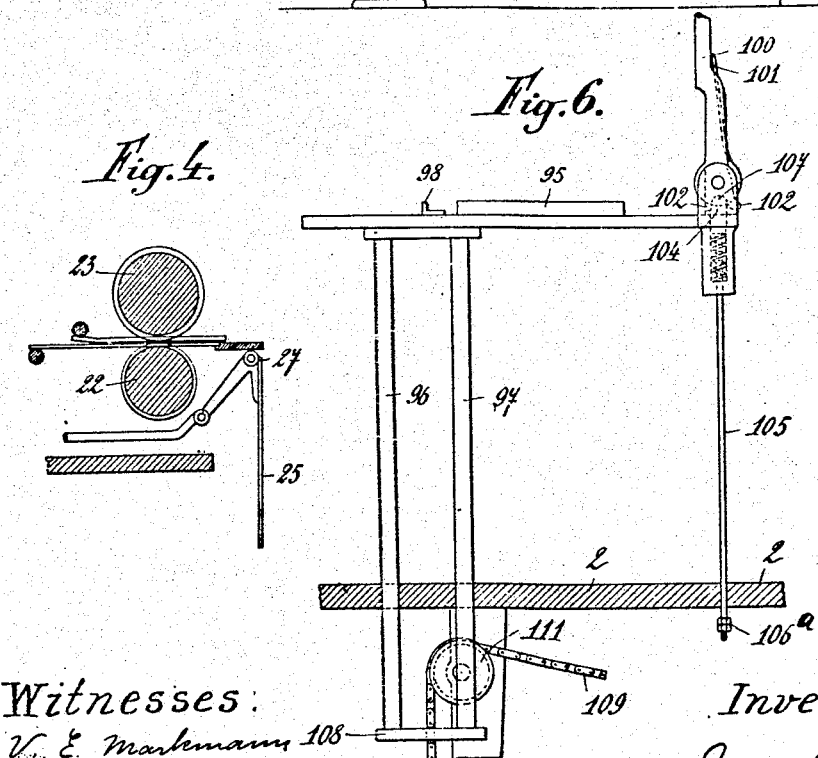

Referring to the annexed drawings: Figure 1 is a front view of the essential parts of a machine constructed according to my invention, showing more particularly the special means adapted to secure the result in view. In the said figure the parts are shown in the position which they occupy for the manufacture of conical tubes with helically twisted outer edges. Fig. 2 is a top view with the parts in the same position, said figure showing, also, one of the tube forming mechanisms. Fig. 3 is a top view similar to Fig. 2 but showing diagrammatically the principal parts of the machine in the position which they occupy for the manufacture of cylindrical tubes. Fig. 4 shows, partly in section, a detail of the feed mechanism. Fig. 5 is a detailed front view at an enlarged scale of a part of the driving gear for the mechanism located on the movable table. Fig. 6 is a front view of a special gripper having a vertical movement, said gripper being shown in its open position. Fig. 7 is a similar view of the gripper shown in Fig. 6 said gripper being in its lowermost position at the moment of its opening. Fig. 8 is a lateral view of said gripper. Fig. 9 is a top view of the machine, similar to Figs. 2 and 3 showing the relative positions of the parts for the manufacture of conical tubes. Fig. 10 shows in elevation a knife or cutting device placed in a fixed position on the frame of the machine and adapted to coöperate with the gripper shown in Fig. 6. Fig. 11 is a top view of said cutting device. Fig. 12 is a view similar to Fig. 10 showing the cutting device in its open position. Fig. 13 is a vertical section through the frame of the machine showing diagrammatically the position of the cutting device shown in Fig. 10 on the frame and relatively to the mandrels of the tube-forming mechanisms. Fig. 14 is a plan view showing diagrammatically the position of the tube-forming mechanisms on the frame of the machine and under the movable table carrying the feed mechanism. Fig. 15 is a detailed view of a supporting guide and knife used in the manufacture of conical tubes. Fig. 16 is a front elevation of one of the tube forming mechanisms, the positions of which are indicated in Fig. 2 Fig. 17 is an end view of said tube forming mechanism shown in Fig. 16. Fig. 18 is a front view of the mandrel showing the tube ejector thereon.

In a machine constructed according to the present improvements the tube-forming mechanisms are located in a fixed and unvaried position upon the frame of the machine and the construction of said tube-forming mechanisms may consequently be of any appropriate kind; it is for this reason that the said mechanisms are merely shown diagrammatically in the annexed drawings together with their driving gears; the feed mechanism, on the contrary will be fully described hereinafter owing to the great importance of the regular feed of the paper to the mandrels of the tube-forming mechanisms in the several positions which are to be given to the feed-mechanism, according to the invention, to suit the requirements of the manufacture of tubes of various shapes.

The machine comprises a frame 1 supporting a table 2 carrying the tube forming mechanisms shown in Fig. 2 by the position of the mandrels 3 and 4 of the two groups of tube-forming mechanisms, and the driving parts of one of said mechanisms. As shown more clearly in Fig. 2, mandrels 3, 4, are supported above table 2, and they are arranged in alinement with each other, said mandrels being conical or tapering and positioned reversely to each other. The mandrels are spaced so that a blank cutting mechanism will operate between them, and the cut portions of the blanks are adapted to be transferred to the respective mandrels by appropriate mechanism, all as hereinafter described. The said table 2 carries by a number of standards 5 a guide 6 of circular shape, the center 7 of which is located at the middle of the distance separating the two mandrels 3 and 4. The guide 6 supports a table 8 which is further carried by a number of standards 9 adapted to slide in a guide 10 fixed to the table 2 and provided with a circular groove concentric with the guide 6. The table 8 carries by depending arms or brackets 11—12 a roller 13 from which unwinds the paper-web 14 used for the manufacture of the paper-tubes. The paper 14 coming from the roller 13 passes on suitable guides such as for example on a rod 15, then between auxiliary pasting and scraping mechanisms such as indicated diagrammatically at 16 (Fig. 1), then on a guide-rod 17 and is finally conducted above the table 8 above and under suitable guides 18—19—20 and 21 before being introduced between the feed rollers 22 and 23 of any suitable construction and which, if necessary, may be provided with guides (Fig. 4) similar to the guides already described in my former patent for the same purpose. The guiding devices for the paper may obviously be of any suitable construction and as they are well known to those skilled in the art, it is thought that a further description may be dispensed with. The number of the said paper guiding devices may be varied according to the circumstances and, if it is found advisable, the guide-rods already mentioned may be completed as shown in Figs. 2 and 4 by two guide-plates 24—25 placed under the paper-web 14, one of which 24 is pivoted on a vertical axis 26 and the other on a horizontal axis 27. The said guide-plates are then operated by levers 28—29 respectively to which a reciprocating movement is communicated by a lever 30 pivoted at 31 (Fig. 2) on the table 8 and oscillated by a cam 32 mounted on a shaft 53 hereinafter described. The guide-plates 24—25 have for their purpose to support the paper-web 14 when emerging from between the feed-rollers 22—23 but do not make an essential part of my invention; they may be omitted without inconvenience.

The different sets of mechanism which the machine comprises are operated by a single shaft 33 mounted in brackets 34 fixed to the table 2; the said shaft drives by gear wheels 36 a second shaft 37 mounted in bearings 38 fixed to the table 2. The shaft 37, on the other hand drives by gear wheels 39 a third shaft 40 driving by gear-wheels 41 a shaft 42 parallel with the shaft 37. Said shaft is provided, as will hereinafter appear, with cams for operating levers 126 by which certain grippers 123 are actuated, see Fig. 14, the shaft 42 thus constituting a gripper operating shaft. The shafts 33 and 40 are the main driving shafts for the tube-forming mechanisms. The shaft 33 drives the feed-mechanism and also all auxiliary mechanisms supported by the movable table 8. Motion can be transmitted from shaft 33 to the mechanisms which are supported by table 8 by aid of a set of three gear-wheels 44. One of said gear-wheels 44 is mounted on shaft 33; a second is mounted on a vertical trunnion fixed to table 2 and the third of said gear-wheels is mounted on a shaft 43 so as to be adapted to roll on the horizontal wheel when the movable table 8 is angularly displaced relatively to the table 2 of the machine.

The shaft 43 is provided on a portion of its length with a spline 45 (Fig. 5) and is passed through a bracket 46 fixed to the movable table 8. The said bracket 46 is provided with a vertical sleeve 47 supporting a trunnion 48 on which is mounted, at the lower end, a pinion 49 which is driven by a pinion 50 mounted on shaft 43 and adapted to slide on the spline 45. Said pinion 50 is provided with a hub 51 which, although adapted to rotate freely in the bracket 46 secures a connection between pinion 50 and bracket 46 in such a manner that on a movement of the table 8, the pinion 50 is adapted to move along the spline 45 of shaft 43 while taking part in the rotation of said shaft 43 in any of the positions of table 8. The vertical trunnion 48 is provided at its upper end with a pinion 51 meshing with a pinion 52 mounted at the end of a shaft 53 adapted to rotate in bearings 54, the latter being fixed to shiftable table 8 at or near one side edge thereof, see Figs. 1, 2, 3, and 5. The said shaft 53 is the driving shaft for the feed mechanism and drives by a pinion 55 a pinion 56 mounted on a short shaft 57 carrying a toothed wheel 58 meshing with a toothed wheel 59 on shaft 60 of the feed-roller 22 suitably mounted in the bearings 61 between which are fixed the guide-rods 19, 20 and 21 already referred to. The shaft 53 actuates also one or more driving mechanisms such as 62 for the pasting, scraping or other auxiliary devices. It is also provided with the cam 32 already mentioned acting on the oscillating lever 30 for the guides 24 and 25. The shaft 53 carries further at its end two cam-wheels 63—64 acting on levers 65—66 pivoted respectively to brackets 67—68. The lever 65 operates a knife 69, the shape of which varies with the shape of the tubes which are to be produced. The said knife 69 is mounted on a support 70 and is adapted to be oscillated. The lever 66 cooperates with a support 71 acting as a guide for the paper and which is used only in the manufacture of certain tubes, for instance of conical tubes, and when the movable parts of the machine are in a position similar to that shown in Figs. 2 and 9. The said support 71 cooperates with lever 66 to form a gripper adapted to hold the paper strip at its extremity during the cutting operation and before the displacement of the tube-blank to bring it to the tube-forming mechanism. The support 71 further cooperates with a knife 72 (Figs. 1, 2 and 15) of the same shape. The support 71 is carried by a lever 73 oscillating at the end of a shaft 74 mounted obliquely on the table 2 and turning in bearings 75. Said shaft 74 carries, at its end, an arm 76 extending under a lever 77 pivoted to a support 78 and acted upon by a cam 79 mounted on shaft 37. This arrangement has for its purpose, as will be hereinafter explained, to allow of removing the support 71 out of the way of the tube-blank when the latter is to be displaced to the tube-forming mechanism. To this end, when lever 77 is acted upon by cam 79, the arm 76 is displaced downwardly, thus rocking the shaft 74 and displacing angularly the support 71. The knife 72 which cooperates with the support 71 (Fig. 15) is mounted on a lever 80 pivoted at 81 to a vertical support 82 fixed to the table 2. The said lever 80 is acted upon by a spring 83 holding the lever in its raised position and is adapted to be displaced downwardly by a connection 84 with a lever 85 pivoted at 86 to the support 82. The said lever 85 is acted upon by a cam 87 (Figs. 2 and 15) mounted on shaft 37 in such a manner that at each operation of the cam 87 the knife 72 is displaced downwardly and makes contact with the support 71, thus cutting a tube-blank which is held by the gripper formed by the said support 71 and the lever 66.

In the axis of the mandrels 3 and 4 two supports 88—89 (Figs. 10, 12, 14) are placed leaving between them a free space; the said supports are placed symmetrically to the center 7 of rotation of the table 8 and cooperate with a knife 90, the position of which remains unvaried whatever may be the shape of the tubes which are to be produced. The knife 90 is pivoted at 91 to a support 92 and may be acted upon by a lever 93 actuated by the shaft 42 as shown diagrammatically in Fig. 14.

Between the two supports 88—89 is placed one of the most important members of the machine that is to say a gripper 94 having a vertical reciprocating movement. The said gripper 94 is shown separately Figs. 6–7 and 8 while Figs. 2–3 and 9 give a plan view of the same. The said gripper 94 comprises a lower jaw 95 fixed to two vertical rods 96 and 97 passing through holes in the table 2 (Fig. 6). To the lower jaw 95 is fixed a piece 98 provided with a square edge adapted to fill the space between the supports 88 and 89 when the gripper 94, being in its lower position, is on a level with said supports. The lower jaw 95 carries on a trunnion 99 a movable jaw 100 which is acted upon by a spring 101 and is provided with two projections 102 adapted to be met by a cam 103 mounted on the shaft 37. The said gripper 94, which, when it is seen from the top, has substantially the shape shown in Figs 2, 3 or 9, is provided with a locking bolt 104 carried by a rod 105. A spring 106 surrounding the rod 105 holds the locking bolt 104 in its raised position and in engagement with the movable jaw 100 in such a manner that during the ascent of the gripper, said movable jaw can be retained in a raised, open position (Fig. 6) until the nut 106ᵃ of rod 105 strikes against the table 2. This arrangement will appear clearly from a comparison between Figs. 6 and 7 which show the gripper 94 in two different positions, Fig. 6 showing the gripper nearly at the upward limit of its movement. When the gripper is being raised, the movable jaw 100 is held in a vertical or open position by the engagement of the locking-bolt 104 between the two projections 102 in the space 107, but as the gripper reaches the end of its ascending stroke, then the nut 106ᵃ, at the end of rod 105, strikes against the lower face of table 2, and withdraws the locking-bolt 104 from the projections 102. The movable jaw 100 is then turned down by the spring 101 onto the lower jaw 95, thus closing the gripper which remains in this position while the gripper moves downwardly. On reaching the lower limit of its downward travel, the projections 102 are acted upon by cam 103, thus causing the gripper to again open, and at this time the locking-bolt 104 is impelled by spring 106 between the projections 102, to lock the jaw 100 in an open position. As already stated the gripper 94 has a vertical reciprocating movement produced as follows: The two rods 96 and 97 supporting the gripper are connected under table 2 by a cross-bar 108 to which is fixed a chain 109 passing over suitable rollers 110, 111, 112 mounted in a bracket 113 depending from table 2. The chain 109 is acted upon by a lever 114 pivoted to a shaft 115 mounted in bearings 116 fixed to the frame 1. The shaft 115 is driven from outside the frame by a crank 117 connected to a rod 118 pivoted to another crank 119 rotated by a pinion 120 gearing with pinion 121 at the end of the transverse shaft 40.

Besides the hereinbefore described parts or elements the machine is further provided, as shown diagrammatically in Fig. 14, with auxiliary members coöperating with the tube-forming mechanisms. The said auxiliary members consist of two grippers 122—123 having a rectilinear reciprocating movement in a horizontal plane passing through the axis of the mandrels 3—4. The said grippers are actuated in any suitable and well known manner for instance by toothed wheels 123ª—124 mounted on the transverse shafts 33 and 40 respectively and are opened and closed at the required moments by levers 125—126 which are acted upon by cams mounted on the shafts 37 and 42.

The tube-forming mechanisms properly so called are of any known construction for instance of the construction shown in Figs. 16, 17 and 18, Fig. 2 showing the principal parts of the tube forming mechanism in connection with mandrel 4.

I will now describe briefly one form of the tube forming mechanism in connection with mandrel 4 with which is associated shaft 40, but similar devices are employed in connection with the other mandrel 3 adapted to be driven by shaft 33. Said shaft 40 drives, through a gear wheel 128, a second gear wheel 129, the latter being mounted on an end of a shaft 130, supported in bearings 131. On the other end of said shaft 130 is a toothed wheel 132, driving a secondary shaft 133 by a toothed wheel 134. On the secondary shaft 133 is keyed a toothed wheel 135, gearing with a pinion 136 mounted on the axle of mandrel 4 between bearings 137. Wheel 132 is toothed only for a part of its circumference, and it is obvious that following the rotation of shaft 40, mandrel 4 will be rotated by the driving mechanisms just described, for a part of a rotation, and said mandrel will remain at rest during a part of each rotation of shaft 40 for the reception of the tube blank which is fed to the mandrel by its associated gripper 123. Each mandrel (3 or 4) coöperates further with a brush 138. Said brush is carried by a shaft 139 supported in a bearing 140 and provided with a chain wheel 141, operated by a chain 142 which is driven by a chain wheel 143 keyed on the shaft 130. Said shaft carries, also, a cam 144 acting on a lever 145, the latter being pivoted on a standard 146 and provided with a presser 147, said presser being arranged below the mandrel and exerting pressure on the tube during its formation. Brush 138, as is well known in similar constructions of tube forming mechanism, rotates in a small vessel (not shown) containing an adhesive substance which is required for pasting the tubes formed on the mandrel. Subsequent to the formation of the tube on the mandrel it is removed by any appropriate means. As shown in Fig. 18, an ejector ring 148 loosely fits the mandrel, and said ring is guided relative to the mandrel by a guide bar 149. The ejector ring is pulled along the mandrel by a cord 150 attached to the sliding support of gripper 123.

In order to point out clearly how the described parts coöperate to secure with a single machine the production of any type or pattern of tubes by simply varying the relative positions of the parts or elements I shall fully describe hereinafter the formation of three different types of tubes of the shapes which are the most used in practice viz: conical tubes with helically twisted outer edges, ordinary conical tubes and cylindrical tubes.

Figs. 1 and 2 show the relative positions of the feed mechanism and tube forming mechanism for the manufacture of conical tubes with helically twisted outer edges. In this case it is necessary to give to the feed mechanism a position substantially at right angles with the axis of the mandrels 3 and 4 and to make use of the curved knives 69 and 72 having substantially the shape shown in Fig. 2. As it will be observed the strip of paper 14 coming from roller 13 and passing between the feed rollers 22—23 is conducted on the guide plate 24 to the guiding support 71 on which it may be held by lever 66. When the strip of paper has reached the illustrated position, the gripper 94 has reached the end of its ascending travel and is open as shown in Fig. 6 in such a manner that the paper has passed above the fixed jaw 95 of the gripper. The machine being in operation, lever 66 is turned down onto the support 71 and holds firmly the paper which is then cut by the operation of knife 69 and knife 72 acted upon by cams 63 and 87. A tube blank 127 is thus produced having two curved edges corresponding to the shape of knives 69 and 72. The said tube blank 127, which is to be used for the production of two tubes, is then gripped by the gripper 94, which having reached its upper position during the feeding of the paper, is then closed by the disengagement of the locking bolt 104 in the manner already described. The double tube blank 127 must then be lowered in the plane of the tube-forming mechanisms by the vertical descending movement of the gripper 94. But in order that said lowering of the tube blank be possible it is necessary that the guides which have supported the same until now be removed from the path followed by the tube-blank carried by the gripper 94. To this end the guide 24 is automatically displaced laterally by the action of cam 32 and the support 71 is carried away by lever 73 (Fig. 15) oscillating with shaft 74 under the action of cam 79. The tube blank 127 can then be lowered without inconvenience with gripper 94. When the said gripper has reached the end of its descending travel the tube blank rests upon the supports 88 and 89 (Figs. 10 and 11), the knife 90 co-operating with said supports being open at this moment. The knife 90 is then acted upon and cuts the tube-blank into two similar parts which are then gripped by the grippers 122—123 and carried away to the mandrels 3 and 4 where the tubes are formed in the ordinary and well known manner, the tubes being pasted and finally ejected in a manner similar to that described in my former patent. During this operation a new feed of paper has taken place, the gripper 94 has again reached its upper position and a new tube-blank is ready to be fed to the tube-forming mechanisms.

It will be noted from Fig. 2 that the loss of paper in the manufacture just described is reduced to a minimum each tube-blank when cut from the strip of paper being used for the production of two tubes which are formed simultaneously and involving only for the exact cutting a loss of paper corresponding to the part of the strip projecting beyond the support 71 and presenting on the projecting edge the curved shape of the knife 69 which edge is then cut by knife 72.

If it is wished to pass from the manufacture just described to the production of tubes having a less conicity (Fig. 9), it is only necessary to move the table 8 on the guides 6 and 10 so as to place the same in another angular position relatively to the axis of the mandrels 3—4 and to make use of a knife 69, a guide or support 71 and a knife 72 having a different shape corresponding to the required tube-blank, the curved knives 69, 72 and guide or support 71 being removable from the machine so that these parts may be used interchangeably with the straight cutting knives 69, 70 of the machine adapted for use as shown in Fig. 3.

Fig. 9 shows the position of the parts for the production of conical tubes which can be considered as intermediate between conical tubes with helically twisted outer edges and cylindrical tubes. As it will be observed the shape of knife 69, support 71 and knife 72 is slightly modified. All the other co-operating parts are in the same position as before on the two tables 2 and 8 and the driving of said parts may be still effected in view of the fact that the variation in the relative positions is obtained by the rotation of table 8 around the center 7 situated at the middle of the distance separating the two mandrels 3—4. The movement of the table 8 is further possible on account of the sliding of the pinion 50 on the spline 45 of shaft 43. The machine operates in this case in conditions which are quite similar to that already described and which will be obvious from an inspection of Fig. 9.

Fig. 3 shows the relative positions of the parts for the manufacture of ordinary cylindrical tubes. As shown, in said case, the table 8 carrying the feed mechanism is placed with its longitudinal axis parallel to the axis of the mandrels 3 and 4. The curved knife 69, lever 66, support 71 and knife 72 are dispensed with, and in lieu thereof I employ a straight knife 69. The straight cut at each end of the rectangular strip of paper is produced by the operation of knife 69; and the second or transverse cut for the division of the double tube-blank into two separate tube-blanks is produced by the operation of knife 90, after the gripper 94 has lowered the double tube-blank from the plane in which the feed takes place into the plane of the tube-forming mechanism.

It will be noted from the foregoing description that in order to secure the production of any kind of tubes whatever with a single machine, it is necessary that the variation of the relative positions of the feed mechanism and tube-forming mechanisms extends at least to 90° or in other words the feed mechanism must be adapted to be displaced angularly from 0° to 90° relatively to the tube-forming mechanism or mandrels 3—4. It is further necessary to make use of a gripper or other conveyer having a vertical movement so as to secure the displacement of the tube-blank or double tube-blank, as the case may be, from the horizontal plane of the feed mechanism to the horizontal plane of the tube-forming mechanisms.

My invention is obviously not restricted to the details of construction of the machine which may be varied to a large extent without departing from the scope of my invention.

Having thus described my invention, what I claim is:

1. In a machine for making tubes of different shapes, tube-forming mechanism, stock feeding mechanism, blank cutting mechanism for shaping the edge portions of material advanced by the stock feeding mechanism, means for shifting the stock feeding and blank cutting mechanisms whereby the direction of feed of the material relative to the tube forming mechanism may be changed, and a separate cutting mechanism occupying a predetermined relation to the tube forming mechanism and operable to divide a double tube blank subsequently to the operation of the blank shaping and cutting mechanisms, said separate cutting mechanism being unaffected by the changes in position of the stock feeding and blank cutting mechanisms relative to said tube forming mechanism.

2. In a machine for making tubes of different shapes, a plurality of tube forming mechanisms spaced relative to each other, a blank cutting mechanism positioned intermediate said tube-forming mechanisms and operable to divide a double tube blank into two distinct portions, means for transferring said distinct divided portions of the tube blank to the respective tube-forming mechanisms, stock feeding mechanism, blank cutting mechanism in coöperative relation to the stock feeding mechanism, and means for shifting the stock feeding mechanism and the second cutting mechanism relative to the tube forming mechanisms, the first-named blank cutting mechanism being unaffected by the changes in position of the stock feeding and second cutting mechanisms.

3. In a machine for making tubes of different shapes, a plurality of tube forming mechanisms spaced relative to each other, blank cutting mechanism positioned intermediate the tube forming mechanisms and operable to divide a double tube-blank into two distinct portions, stock feeding mechanism, another blank cutting mechanism in coöperative relation to the stock feeding mechanism and operable to produce a tube blank of a predetermined shape from the material advanced by said stock feeding mechanism, and means for bodily shifting the stock feeding mechanism and the second blank cutting mechanisms relative to the tube forming mechanisms, said stock feed and second cutting mechanisms being movable around a fixed axis positioned centrally between the tube forming mechanisms.

4. In a machine for making tubes of different shapes, tube-forming mechanisms spaced with relation to each other, a feed table shiftable about an axis positioned intermediate said tube forming mechanisms, stock feeding mechanism carried by said feed table, blank cutting mechanism also carried by the feed table and coöperating with the stock feeding mechanism, means for adjusting the table whereby the relative positions of the stock feeding and blank cutting mechanisms to the tube forming mechanisms may be varied, and a separate cutting mechanism independent of the feed table and positioned intermediate the tube forming mechanisms, said separate cutting mechanism operating to divide a double blank severed from the stock by the first cutting mechanism into two distinct portions which are to be supplied to the respective tube forming mechanisms.

5. In a machine for making tubes, tube forming mechanisms, stock feed mechanism positioned in a different horizontal plane from the plane of said tube-forming mechanisms, blank cutting mechanism coöperating with the stock feed mechanism and positioned in substantially the horizontal plane thereof, a separate cutting mechanism positioned intermediate the tube forming mechanisms, said separate cutting mechanism being operable subsequently to the blank cutting mechanism for dividing double tube-blanks into two separate tube-blanks, means whereby the stock feed mechanism and the first named blank cutting mechanism may be shifted into different positions relative to the tube forming mechanisms, and blank gripping mechanism positioned to receive tube blanks from the plane of the stock feed mechanism and of the first cutting mechanism and to transfer the tube-blanks to the plane of the second cutting mechanism and the tube forming mechanisms.

6. In a machine for making tubes of different shapes, a plurality of tube-forming mechanisms, a rotatable feed table shiftable about an axis positioned intermediate the tube-forming mechanisms, stock feed mechanism carried by said table, blank cutting mechanism mounted on the table and positioned in coöperative relation to the stock feed mechanism for cutting double blanks of a predetermined shape from the material advanced by said feed mechanism, means for shifting the table relative to the tube-forming mechanisms, whereby the relations of the stock feed and blank cutting mechanisms to the tube forming mechanisms may be varied, means for driving the stock feed and blank cutting mechanisms in all positions of the rotatable table, and a separate cutting mechanism positioned intermediate the tube forming mechanisms and operable to sever a double tube blank into two distinct portions subsequent to the operation of cutting the tube blank from the material advanced by the feed mechanism.

7. In a machine for making tubes of different shapes, a plurality of tube-forming mechanisms, a feed table shiftable relative to the tube forming mechanisms, stock feed mechanism and blank cutting mechanism mounted upon said table to occupy operative positions in a different horizontal plane from the plane of said tube-forming mechanism, means whereby the feed table may be shifted to vary the relation of the stock feed and blank cutting mechanisms to the tube-forming mechanisms, and blank gripping and cutting mechanism positioned intermediate the tube forming mechanisms and operable to displace double blanks cut by the first cutting mechanism from the horizontal plane of stock feed mechanism to the horizontal plane of the tube forming mechanism.

8. In a machine for making tubes, tube-forming mechanism, stock feeding mechanism positioned in a different horizontal plane from the plane of the tube-forming mechanism, cutting mechanism in coöperative relation to the stock feeding mechanism, means for adjusting the stock feeding mechanism and the cutting mechanism to different positions relative to the tube-forming mechanism, whereby the direction of feed of the stock relative to the tube-forming mechanism may be varied, a separate cutting mechanism operable subsequently to the first cutting mechanism for severing into two distinct portions the material cut by said first cutting mechanism, means for carrying the blanks from the plane of the stock feeding mechanism to the plane of the tube-forming mechanism, and means for transferring the blanks to the tube-forming mechanism.

9. In a machine for making tubes of different shapes, a fixed frame, a plurality of tube-forming mechanisms thereon, a feed table movable to different positions relative to the tube-forming mechanisms, means for adjusting said feed table, stock feeding mechanism and blank cutting mechanism carried by said feed table and shiftable therewith to vary the direction of feed of tube blanks relative to said tube forming mechanisms, means for imparting motion to the stock feed and blank cutting mechanisms at all positions of the feed table, blank gripping and cutting mechanisms, and means for imparting reciprocating motion to the blank gripping and cutting mechanism.

10. In a machine for making tubes, a fixed frame, a plurality of tube-forming mechanisms mounted on said frame, a table movable about an axis positioned intermediate the tube-forming mechanisms, a feed mechanism carried by said table and positioned in a horizontal plane different from the plane of the tube-forming mechanism, cutting mechanism also carried by the table, means for adjusting the table to different positions relative to the tube-forming mechanisms whereby the direction of feed of the material advanced by the feed mechanism may be varied relative to the tube-forming mechanisms, separate cutting mechanism positioned intermediate the tube-forming mechanisms and operating subsequently to the first cutting mechanism, and means whereby tube-blanks produced by the two cutting mechanisms may be displaced from the plane of the feed mechanism to the level of the tube-forming mechanisms.

11. In a machine for the production of tubes a frame, a fixed table supported by said frame, two tube-forming mechanisms mounted in alinement on said table, a movable table adapted to be displaced on the fixed table around a center point situated at the middle of the distance between the two tube-forming mechanisms, a feed mechanism supported by said movable table, a cutting mechanism carried by the movable table and occupying normally a coöperative relation to the feed mechanism, means for adjusting the table whereby the relation of the feed mechanism and the cutting mechanism to the tube-forming mechanisms may be varied, a separate cutting mechanism positioned intermediate the tube-forming mechanisms, said separate cutting mechanism being unaffected by the adjustment of the movable table and said feed mechanism operating subsequently to the first cutting mechanism, and means for transferring the blanks produced by the operations of said cutting mechanisms to the tube-forming mechanisms.

12. In a machine for the production of tubes a frame, a fixed table supported by said frame, two tube-forming mechanisms mounted on said table, a movable table adapted to be displaced on the fixed table around a center point situated at the middle of the distance between the tube-forming mechanisms, means for feeding sheet material from said movable table, means whereby tube-blanks may be produced from said material, and means for supplying the said tube blanks to the two tube-forming mechanisms.

13. In a machine for the production of tubes, a frame, a fixed table supported by said frame, two tube-forming mechanisms mounted in alinement on said table, a movable table supported above the fixed table and adapted to be placed in a position parallel to or at an angle to the tube-forming mechanisms, means for feeding sheet material, the said means being carried by the movable table, cutting mechanism for producing tube blanks from said material, means for lowering the tube-blanks from the path of feed of the sheet material to the level of the tube-forming mechanisms and means for supplying the tube-blanks to the tube-forming mechanisms.

14. In a machine for the production of tubes, a frame, a fixed table supported by said frame, two tube-forming mechanisms mounted in alinement on said table, a movable table supported above the fixed table, means for feeding sheet material, the said means being mounted on the movable table and adapted to be placed in different angular positions to the two tube forming mechanisms, cutting mechanism whereby tube blanks may be produced from the sheet material, means for lowering the double tube blanks from the path of feed of the sheet material to the level of the tube-forming mechanisms, means for cutting the double tube-blanks into two similar parts and means for supplying each of said parts of double tube blanks to a tube forming mechanism.

15. In a machine for the production of tubes, a frame, a fixed table supported by said frame, two tube-forming mechanisms mounted in alinement on said table, a movable table supported above the fixed table, a feed mechanism mounted on said movable table, means for driving the said feed mechanism in any position of the movable table, cutting devices mounted on the movable table, means for displacing the said cutting devices out of their operating position, a gripper having a vertical movement, a cutting device mounted in a predetermined position on the fixed table and means for supplying tube-blanks to the tube forming mechanisms.

16. In a tube making machine, a plurality of tube-forming mechanisms, a feed table shiftable about an axis positioned intermediate said tube forming mechanisms, stock feeding mechanism and blank cutting mechanism carried by said table, means for shifting the feed table at will, blank gripping and cutting mechanism positioned intermediate the tube-forming mechanisms, and means for imparting reciprocating motion to the blank gripping and cutting mechanism whereby a tube blank may be transferred from the horizontal plane of the stock feeding mechanism to that of the tube forming mechanisms and at the same time a double tube blank is cut into two separate single blanks.

17. In a machine for making tubes, a plurality of tube forming mechanisms, a feed table, means for shifting the position of said feed table relative to the tube forming mechanisms, stock feed mechanism and blank cutting mechanism supported by said table and positioned in a plane above that of the tube-forming mechanisms, means for imparting motion to the stock feed and blank cutting mechanisms in all the positions to which the feed table may be adjusted, blank gripping and cutting mechanism separate from the feed table and positioned intermediate the tube forming mechanisms, and means for imparting reciprocating motion to the blank gripping and cutting mechanism.

In testimony whereof I have signed my name to this specification in the presence of two subscribing witnesses.

JEAN GOHY.

Witnesses:
GREGORY PHELAN.
GEORGE BEDE.